United States Patent
Vainik et al.

(10) Patent No.: US 9,615,233 B2
(45) Date of Patent: Apr. 4, 2017

(54) METHOD AND SYSTEM OF MANAGING DISTRIBUTION OF ALERTS

(75) Inventors: Feliks Vainik, Natania (IL); Guy Weiss, Herzlia (IL)

(73) Assignee: eVigilo Ltd., Natania (IL)

( * ) Notice: Subject to any disclaimer, the term of this patent is extended or adjusted under 35 U.S.C. 154(b) by 0 days.

(21) Appl. No.: 13/818,689

(22) PCT Filed: Aug. 17, 2011

(86) PCT No.: PCT/IL2011/000668
§ 371 (c)(1),
(2), (4) Date: Feb. 25, 2013

(87) PCT Pub. No.: WO2012/025918
PCT Pub. Date: Mar. 1, 2012

(65) Prior Publication Data
US 2013/0157610 A1    Jun. 20, 2013

Related U.S. Application Data

(60) Provisional application No. 61/376,274, filed on Aug. 24, 2010, provisional application No. 61/376,276, (Continued)

(51) Int. Cl.
| H04H 20/59 | (2008.01) |
| H04W 4/22 | (2009.01) |
| G06F 11/07 | (2006.01) |

(52) U.S. Cl.
CPC .......... *H04W 4/22* (2013.01); *G06F 11/0781* (2013.01); *H04H 20/59* (2013.01)

(58) Field of Classification Search
CPC ..... G08B 27/006; G08B 25/009; H04M 11/04
(Continued)

(56) References Cited

U.S. PATENT DOCUMENTS

| 8,013,733 B1 * | 9/2011 | Vallaire ...................... 340/539.1 |
| 2002/0131397 A1 | 9/2002 | Patel et al. |

(Continued)

FOREIGN PATENT DOCUMENTS

| WO | WO 2012/025918 | 3/2012 |
| WO | WO 2012/025919 | 3/2012 |
| WO | WO 2012/025920 | 3/2012 |

OTHER PUBLICATIONS

International Preliminary Report on Patentability Dated Mar. 7, 2013 From the International Bureau of WIPO Re. Application No. PCT/IL2011/000668.
(Continued)

*Primary Examiner* — William Nealon

(57) ABSTRACT

System and method of managing distribution of alert messages to a plurality of presentation devices. The system enables receiving an alert distribution request from an alerting source, including emergency situation data and indication of an area associated with the emergency situation, creating an alert message corresponding to the alert distribution request and identifying broadcasting operators, which enable distributing the alert message in the emergency area. Once the alert message is created and the broadcasting operators are identified, the system forwards the alert message to the identified broadcasting operators. The broadcasting operators broadcast the alert message to the plurality of presentation devices such as mobile devices, TV sets, radio devices, and the like.

16 Claims, 4 Drawing Sheets

Related U.S. Application Data filed on Aug. 24, 2010, provisional application No. 61/423,132, filed on Dec. 15, 2010.

(58) Field of Classification Search
USPC .............. 455/432.3, 433, 458; 709/206–207
See application file for complete search history.

(56) References Cited

U.S. PATENT DOCUMENTS

| | | | |
|---|---|---|---|
| 2004/0103158 A1* | 5/2004 | Vella et al. .................... | 709/206 |
| 2005/0261012 A1 | 11/2005 | Weiser | |
| 2006/0223492 A1* | 10/2006 | Chin et al. ................. | 455/404.1 |
| 2006/0223546 A1 | 10/2006 | Claussen | |
| 2007/0202927 A1* | 8/2007 | Pfleging et al. ............. | 455/567 |
| 2008/0018453 A1 | 1/2008 | Adler | |
| 2008/0227428 A1 | 9/2008 | Rezaiifar et al. | |
| 2009/0227224 A1* | 9/2009 | Aftelak et al. ............. | 455/404.2 |
| 2009/0247116 A1 | 10/2009 | Sennett et al. | |
| 2009/0295587 A1* | 12/2009 | Gorman, Jr. .................. | 340/601 |
| 2009/0298460 A1 | 12/2009 | Ruda et al. | |
| 2009/0325538 A1* | 12/2009 | Sennett et al. ............. | 455/404.2 |
| 2010/0093377 A1 | 4/2010 | Riley et al. | |
| 2013/0157609 A1 | 6/2013 | Vainik et al. | |

OTHER PUBLICATIONS

International Preliminary Report on Patentability Dated Mar. 7, 2013 From the International Bureau of WIPO Re. Application No. PCT/IL2011/000669.

International Preliminary Report on Patentability Dated Mar. 7, 2013 From the International Bureau of WIPO Re. Application No. PCT/IL2011/000670.

Official Action Dated Jul. 17, 2014 From the US Patent and Trademark Office Re. U.S. Appl. No. 13/818,688.

International Search Report and the Written Opinion Dated Jan. 5, 2012 From the International Searching Authority Re. Application No. PCT/IL2011/000668.

International Search Report and the Written Opinion Dated Jan. 5, 2012 From the International Searching Authority Re. Application No. PCT/IL2011/000669.

International Search Report and the Written Opinion Dated Dec. 23, 2011 From the International Searching Authority Re. Application No. PCT/IL2011/000670.

Official Action Dated Jul. 19, 2016 From the US Patent and Trademark Office Re. U.S. Appl. No. 13/818,688.

\* cited by examiner

METHOD AND SYSTEM OF MANAGING DISTRIBUTION OF ALERTS

RELATED APPLICATIONS

This application is a National Phase of PCT Patent Application No. PCT/IL2011/000668 having International filing date of Aug. 17, 2011, which claims the benefit of priority under 35 USC §119(e) of U.S. Provisional Patent Application No. 61/376,274 filed on Aug. 24, 2010, 61/376,276 filed on Aug. 24, 2010 and 61/423,132 filed on Dec. 15, 2010. The contents of the above applications are all incorporated by reference as if fully set forth herein in their entirety.

FIELD AND BACKGROUND OF THE INVENTION

The present invention, in some embodiments thereof, relates to systems and methods of managing distribution of alert messages.

Alert systems are commonly used in many organizations and facilities and usually involve detection of an alerting situation and reporting the situation to one or more authorized destinations.

Many commercial alarm systems use sensors to detect emergencies such as burglary, leakages of chemicals, or fire and transmit the sensors data to a designated emergency center upon. The center, in turn, transmits messages or calls one or more predefined people to report the emergency situation. Other systems allow people using communication devices to report an emergency situation to an emergency center by calling the emergency center. The center then allows disseminating an alert to designated destinations such as the owner of the facility where the emergency situation occurs. In many cases the designated person cannot respond or react to the emergency situation since the designated person is too far from the location of interest or for other reasons. In this case the person himself is required to contact the police, the fire department, and the like, to ask them to handle the situation.

Other alert systems verify the emergency situation and initiate communication with the authority related to the situation such as the fire department or the police, upon verification of the emergency situation. The communication in some systems is automatic, where the system automatically transmits a message to the police or the fire department and in other systems a human operator calls these authorities.

System such as the commercial mobile alert system (CMAS) or the AMBER alert system allow transmitting text messages through emails or short messaging services (SMS) messages to a plurality of destinations such as police departments and other authorized registered destinations to notify an alert. These systems enable transmission of alert messages on a large scale to a large population in counties, organization departments and the like to allow as many people or organizations that are registered to assist in solving the emergency situation. For example, the AMBER system for searching of missing children transmits messages to as many people and organizations possible in the designated country or county where the child was last seen to allow as many people as possible to assist in searching for that child.

SUMMARY OF THE INVENTION

According to some embodiments of the present invention, there is provided a system of managing distribution of alert messages to a plurality of presentation devices. The system comprises an alert receiving interface, which receives an alert distribution request from an alerting source, where the alert distribution request comprises emergency situation data indicative of at least one area associated with the emergency situation, at least one database including a list of predefined broadcasting operators, each broadcasting operator in the list is associated with at least one distribution area, a processing module, which creates an alert message corresponding to the alert distribution request and identifies at least one broadcasting operator from the database associated with a distribution area that corresponds to at least one of the indicated at least one area, and a transmission module, which forwards the alert message to the identified broadcasting operator so as to allow distributing the alert message to the plurality of presentation devices in the at least one area via at least one broadcasting network.

Optionally, the transmission module interfaces a plurality of broadcasting operators and modifies the alert message by adapting configuration of the alert message to a gateway of each of the identified broadcasting operators. Each broadcasting operator may be a cellular broadcasting system enabling transmission of messages over a plurality of wireless communication links.

Additionally or alternatively, the alert receiving interface enables receiving updated information, in real time, indicating current status of the emergency situation, where the processing module creates new updated alert messages corresponding to the updated information. Respectively, the transmission module forwards the updated alert messages for being broadcasted substantially in real time through the identified broadcasting operators.

Optionally, the processing module further enables identifying alternative suitable broadcasting operators upon identifying a change in the area associated with the emergency situation from the updated information. The transmission module, respectively, forwards the updated message to the alternative suitable broadcasting operators so as to be broadcasted in real time thereby.

Optionally, the processing module receives status alerts from the broadcasting operator indicating transmission status of the alert message in relation to each broadcasting operator to which the alert message was transmitted, where the processing module executes a backing process in response to receiving the status alerts.

The system may further comprise at least one sensors unit, which detects at least one alerting condition in a predefined area, and transmits an alert distribution request to the alert receiving interface upon detection. The alert distribution request may comprise sensors data and the respective predefined area, where the processing module automatically determines the broadcasting operators according to a combination of the sensors data and the predefined area.

Optionally, the system comprises a graphical user interface which enables a user to create the alert distribution request and to send it to the alert receiving interface over a communication link.

Additionally or alternatively, the processing module enables creating a plurality of different alert messages associated with the alert distribution request, and identifying a plurality of broadcasting operators, where each alert message is assigned to a different broadcasting operator, and where the transmission module forwards each alert message to its respective broadcasting operator for allowing broadcasting each assigned alert message through a different suitable broadcasting operator.

Optionally, the processing module identifies a plurality of broadcasting operators from the database each associated with a distribution area that corresponds to one of a plurality of indicated areas associated with an emergency situation; and where the transmission module forwards the alert message to the identified plurality of broadcasting operators so as to allow distributing it to the plurality of presentation devices in a plurality of corresponding distribution areas via at least one broadcasting network.

Optionally, the processing module creates a plurality of alert messages, each indicative of a respective one of the plurality of areas, each identified broadcasting operator broadcasts a respective alert message indicative of an area corresponding to its distribution area.

According to some embodiments of the present invention, there is provided a method of managing transmission of alert messages to a plurality of presentation devices. The method may comprise receiving an alert distribution request from an alerting source, where the alert distribution request comprises emergency situation data, indicative of an area associated with the emergency situation, creating an alert message corresponding to the alert distribution request, identifying at least one broadcasting operator, which enables distributing the alert message in the area, forwarding the alert message to each identified broadcasting operator, and broadcasting the alert message to the plurality of presentation devices via at least one broadcasting network.

Optionally, the method further comprises modifying the alert message according to configuration requirements of each identified broadcasting operator.

Additionally or alternatively, the method further comprises transmitting at least one map to a user for allowing the user to define at least one area associated with the emergency situation.

Optionally, the method further comprises automatically transmitting an alert distribution request, upon detection of an emergency situation.

Additionally or alternatively, the method further comprises automatically converting textual content of the alert message into a voice message using text to speech conversion, and voicing the voice message through audio devices of the presentation devices.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
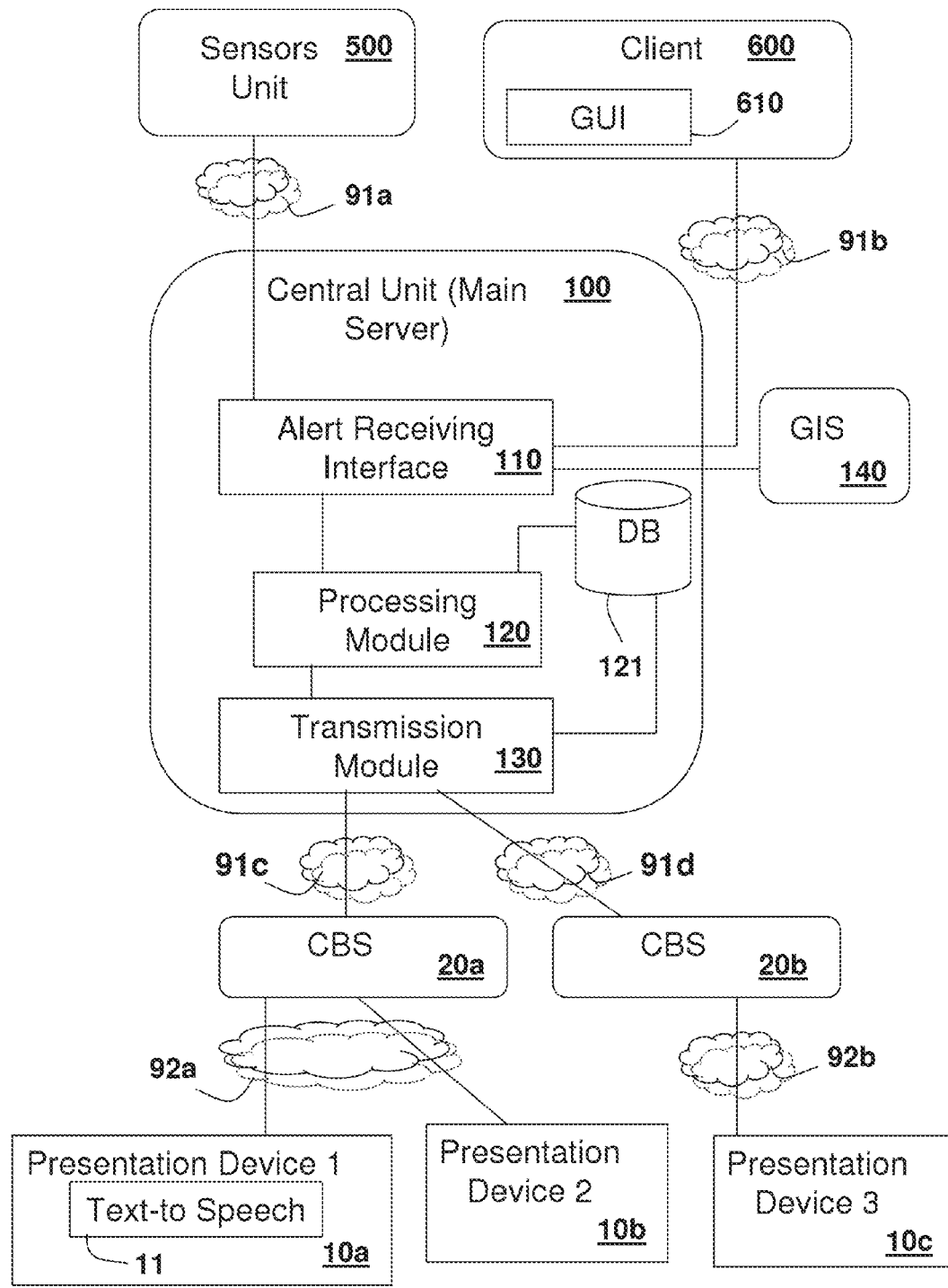
FIG. 1 is a block diagram schematically illustrating a system of managing distribution of alert messages, according to some embodiments of the present invention.

The present invention, in some embodiments thereof, relates to systems and methods of managing distribution of alert messages.

The systems and methods enable distributing alert messages through one or more broadcasting operators, when a relevant emergency situation is detected. The broadcasting is based on an area associated with the detected emergency situation. The systems and methods allow increasing awareness to various types of emergency situations by enabling broadcasting alert messages in an area associated with each emergency situation, through various types of broadcasting operators and technologies such as through television (TV) and/or radio broadcasting networks such as digital video broadcasting (DVB) and/or digital audio broadcasting (DAB) networks, cellular broadcasting systems (CBS), and the like. Therefore, the systems and methods of the present invention enable alerting large populations located in an area in which an emergency situation occurs, within a critical minimal time span to allow them to respond to the situation in an optimal manner.

The systems and methods provide a distribution process in which alert distribution requests, each associated with an emergency situation, are received from one or more alerting sources such as designated client terminals, for example mobile devices, such as tablets, laptops and cellular phones and/or automotive alarm and/or monitoring systems, for example stationary sensors and/or data monitoring units. Each received alert distribution request initiates a process in which an alert message is created, corresponding to the received alert distribution request. The alert distribution request includes data relating to the emergency situation such as the type of the situation, the area in which it takes place, urgency and/or security level associated with the emergency situation and the like. Each alert message is then transmitted to one or more broadcasting operators having a distribution area which corresponds to the emergency situation area for being broadcasted thereby to various presentation devices located in the distribution area, over various broadcasting networks, such as over one or more wireless communication networks, TV networks, radio transmission networks, and the like.

The systems and methods allow receiving alert distribution requests of various types and formats such as extensible markup language (XML) based messages, HTTP headers, common alert protocol (CAP), and the like and broadcast alert messages using various types of broadcasting and messaging technologies such as cellular broadcasting (CB) short messaging service (SMS) known as SMS-CB, radio broadcasting technologies, television broadcasting technologies such as DVB and/or DVB-terrestrial (DVB-T), and the like. The systems and methods allow presenting the alert message by displaying and/or voicing thereof through presentation devices such as TV sets, electronic billboards, mobile devices of users such as mobile phones, personal digital assistance (PDA) devices, and/or radio devices. This allows different devices and/or monitoring systems to transmit alert distribution requests and/or receive alert messages in real time.

The systems and methods optionally allow receiving and/or identifying a plurality of emergency situation areas associated with the same emergency situation and identifying a plurality of broadcasting operators of a plurality of distribution areas, each corresponding to a different one of the emergency situation areas. The alert message may then be broadcasted by these broadcasting operators in each one of the distribution areas so as to notify people located in areas which may be affected by the emergency situation. A plurality of different alert messages for different emergency situation areas may be created and broadcasted through different broadcasting operators of the respective distribution area. For example, in a case of an alert of multiple bombs located in two different cities: London and Paris, the system will create two corresponding alert messages: one indicative of the London area and another indicative of the Paris area. Each alert message will be broadcasted by two sets of broadcasting operators a first set including one or more broadcasting operators that can broadcast messages in London and a second set that can broadcast messages in Paris.

Reference is now made to FIG. 1, which is a block diagram schematically illustrating a system of managing distribution of alert messages, according to some embodiments of the present invention. The system includes a central unit 100, which may include one or more main servers, which receive alert distribution requests from one or more alerting sources, analyzes each received alert distribution request and manages distribution of an alert message corresponding to the received alert distribution request, according to the analysis thereof.

The central unit 100 may receive alert distribution requests from one or more sensors units such as sensor unit 500. The sensor unit 500 includes one or more sensors such as thermometers, optical volume sensors, smoke detectors, and the like, located in a predefined monitored area, monitoring the area for identification of an emergency situation. Each sensor monitors changes in one or more conditions such as temperature, volume changes, flow changes of a liquid and the like. The sensors unit 500 may include a processor enabling to analyze data received from each of its sensors to identify an emergency situation. For example, the sensors unit 500 can identify an emergency situation by identifying deviation from predefined normal values or value ranges of one or more of the sensed parameters.

For example, the sensors unit 500 includes fire detectors, such as thermometers and smoke detectors that detect fire in the monitored area. In another case, the sensors unit 500 is connected to an earthquake detecting system, a Tsunami Warning System (TWS) and the like. Once the sensors unit 500 identifies an emergency situation, it may automatically initiate distribution of an alert message by automatically transmitting an alert distribution request to the central unit 100. The alert distribution request may include information indicating the emergency situation, the sensors output parameters, the time and location of the monitored area, and the like.

Once the sensors unit 500 identifies an emergency situation, it may automatically initiate distribution of alert messages by automatically transmitting an alert distribution request to the central unit 100 through any predefined one or more communication links such as through an internet communication link 91a, a wireless communication link, and the like. The alert distribution request may include information indicating the emergency situation, the sensors output parameters, the time and the area associated with the emergency situation, and additional information relating to the urgency of the situation, the security level associated with the emergency situation and the like.

Additionally or alternatively, the central unit 100 receives alert distribution requests from external existing sensors units, each communicatively associated with the central unit 100.

Additionally or alternatively, the alerting source is a client terminal 600 such as a computer, a laptop, a handheld device such as a cellular phone or a PDA and the like. Once a user identifies an emergency situation, the user manually initiates distribution of an alert message by, for example, retrieving a graphical user interface (GUI) 610 from a designated website supported by the central unit 100. According to some embodiments of the present invention, the GUI 610 allows the user to insert and define the content of the alert message, the area in which the emergency situation takes place, and other parameters such as the urgency level of the situation, the security level associated with the area and/or the emergency situation and the like. The user may transmit the alert distribution request through the GUI 610 using an internet communication link 91b or any other communication technology known in the art such as wireless communication technology.

The GUI 610 may include predefined input fields for allowing the user to input content of the alert message, to select one or more properties the associated with the alert distribution request such as a security level and/or the urgency level, to input a type of the emergency situation, the time passed from the beginning of the situation, and/or the like.

The alert distribution request may be formed once the user has filled all input fields and confirmed transmission of an alert distribution request. The input data may then be formatted by a web application supported by the central unit 100, forming HTTP headers including all inputted information. The headers are transmitted to the central unit 100 through the communication link 91b.

According to some embodiments of the present invention, the system additionally includes a geographical information system (GIS) 140 that allows retrieval of maps upon transmission of a location indication thereto, as known in the art. The GUI 610 may allow automatically transmitting a map retrieval request to the GIS 140 upon receiving user input of the area in which the emergency situation takes place, or alternatively upon automatic identification of the emergency area. The area may be automatically identified by identifying the location of the client 600 which may be known in the system.

The GIS 140 may be used by any system operator, administrator, and the like to select the emergency situation area by marking the area. The marking may be carried out by selecting a specific point on the map and/or by defining a zone on the map, for example, by drawing a polygonal shape around the emergency situation area. This may allow defining the radius around a specific location in which the emergency situation occurs and thereby define the perimeter of the emergency situation area.

As illustrated in FIG. 1, the central unit 100 includes an alert receiving interface 110, which receives alert distribution requests from the alerting sources such as from the sensors unit 500 and/or the client 600. The alert receiving interface 110 manages receiving and/or retrieving alert distribution requests from different sources, different request format types and different retrieval and/or receiving processes.

For example, the sensors unit 500 may transmit a retrieval request, such as a Syslog request for retrieval of an alert distribution request to a remote server such as a file transfer protocol (FTP) based server, associated with the sensors unit 500. The FTP server retrieves the alert distribution request from the sensor unit 500 which is in a format of an FTP header and returns a corresponding alert distribution request in an extensible markup language (XML) format, which is then retrieved by the alert receiving interface 110. This retrieval process allows securing the information of the alert distribution request and may be used in systems and areas where high information security is required.

Additionally or alternatively, the alert distribution request may be formatted and transmitted to the alert receiving interface 110 directly as an XML based request.

As illustrated in FIG. 1, the central unit 100 additionally includes a processing module 120 operatively associated with the alert receiving interface 110 and with one or more databases 121. The processing module 120 receives the alert distribution request from the alert receiving interface 110 and creates an alert message corresponding to the details in the alert distribution request. For example, if the alert distribution request was inputted by the user, the processing module 120 uses the inputted content, area associated with the emergency situation and parameters such as the security and/or urgency level of the alert distribution request, time when the request was received/transmitted, and the like, to create an alert message including the inputted content and indication of the area and parameters. If the alert distribution request was received from a sensors unit 500, for example, the processing module 120 indicates all parameters such as sensors data, area associated with the emergency situation, time of receiving/transmission of the request and/or the type of the emergency situation in the alert message, and the like. The area of the emergency situation may be identified by the processing module 120 upon receiving an identification code of the sensors unit 500 in cases in which the sensors unit 500 is associated with a single known monitored area.

The database 121 may include a list of broadcasting operators for distributing the alert message there through. Each broadcasting operator in the list is associated with one or more distribution areas, meaning that each broadcasting operator allows broadcasting the alert message through one or more broadcasting technologies to a plurality of presentation devices in one or more areas.

The distribution area of each broadcasting operator may be defined according to arrangement and functionalities of transmission systems such as transmission antennas, satellite receiving and transmitting antennas and the like, associated with the broadcasting operator. For example, in a case in which the broadcasting operator is a CBS, the CBS operator allows transmission of SMS-CB messages over a wireless communication link, to mobile devices users in its distribution area using a higher frequency range than the range used for receiving and conducting calls or receiving and transmitting of SMS messages. The distribution area associated with a particular CBS is determined according to the location arrangement of antennas from which the CBS transmits data and according to the transmission area covered by each antenna. Each broadcasting operator may enable transmitting data to one or more types of presentation devices such as mobile devices, TV sets, radio devices and the like. Each broadcasting operator may be associated with a predefined group of presentation devices, such as cable TV subscribers using predefined digital conversion boxes, or mobile devices subscribers using a predefined communication network, and the like.

The presentation devices may be any devices known in the art that allow receiving and outputting of messages for example, display devices such as users mobile devices, electronic billboards, TV sets, personal and/or mobile computers, and the like, allowing visual displaying of text or video messages and/or devices that allow audio voicing of messages such as radios, and all the above mentioned display devices which may also allow outputting audio messages.

CBS servers typically allow automatically transmitting SMS-CB messages to mobile devices of a communication network associated with the CBS located in their distribution area. The CBS usually does not identify the mobile device users in the vicinity of distribution area but simply broadcasts the SMS-CB messages using a designated transmission frequency, The mobile devices of the network located in the distribution area receive those messages by using a designated receiving channel and known in the art applications that allow receiving and displaying of SMS-CB messages.

The processing module 120 identifies broadcasting operators according to the area associated with the emergency situation such as the city the neighborhood, a building location, depending on the type of the emergency situation. For example, in a case in which the emergency situation is a detected pollution which is spread in a city the processing module 120 identifies broadcasting operators in the database 121 that allow broadcasting a corresponding alert message through one or more broadcasting networks in the specific city such as through local or national TV and/or radio networks, through electronic billboards positioned in the city and the like.

According to some embodiments of the present invention, the database 121 is constantly updated regarding the distribution areas covered by each broadcasting operator in the list. Each broadcasting operator may receive real time information relating to the functionality and positioning of each of its associated transmission system such as each antenna, and transmit this information to the central unit 100 for updating the database 121 accordingly.

As illustrated in FIG. 1, the central unit 100 additionally includes a transmission module 130, which receives the content of the alert message and distribution information relating to the broadcasting operators suitable for distribution of the alert message, from the processing module 120. The transmission module 130 is operatively associated with the broadcasting operators, such as one or more cellular broadcasting systems (CBS) 20*a* and/or one or more TV broadcasting systems 20*b* enabling to transmit the alert message to a plurality of presentation devices such as users' mobile devices 10*a*, 10*b* and/or a plurality of home TV sets and/or electronic billboards 10*c* over one or more cellular communication links such as link 92*a* and/or link 92*b*. The broadcasting operator 20*a* may be a CBS server enabling to receive XML based alert messages and transmit those messages as SMS-CB messages to the users' mobile devices through wireless communication links such as link 92*a*. Each broadcasting operator may be associated with a predefined group of subscribers using predefined presentation devices. For example, each CBS operator may be associated with a cellular network having a group of mobile device users, and each Cable TV broadcasting operator may be associated with another group of known subscribers using TV devices and cable converter boxes.

According to some embodiments of the present invention, the central unit 100, which may include one or more web servers may interface with each CBS operator through one or more global systems for mobile communications (GSM). For example, each CBS operator may interface the transmission module 130 through 2G networks allowing the transmission module 130 to transmit the alert message to the CBS operator through global and/or designated internet protocol (IP) by using X.25 protocols converted into a XOT protocols for using TCP/IP in communicating with the CBS operators. This may require installing an input receiving device at the CBS server for allowing receiving TCP/IP based data. Additionally of alternatively, the transmission module 130 may interface each CBS operator using 3G networks, such as through wide-band code division multiple access (WCDMA) and universal mobile telecommunication systems (UMTS). The link to these systems is usually through TCP/IP based protocols. The CBS operator may farther enable transmission of data to the central unit 100 using the same communication link and protocol types for allowing transmission of feedback information to the central unit 100.

According to some embodiments of the present invention, the central unit 100 monitors different aspects of the system's functionality. For example, the central unit 100 may use simple network management protocol (SNMP) that allows monitoring the communication status of the system 100 with network attached devices and indicate in real time any detected communication failure such as communication failure with the sensors system 500 and/or with one or more broadcasting operators. The SNMP may be operated through an external network management system (NMS) enabling to transmit failed communication alerts to the central unit 100. The NMS supports SNMP traps (SNMPTT) and SNMP V2 using enterprise and/or private management information base (MIB). Communication faults detected by the NMS may be indicated according to the fault's details and/or severity. For example, the severity report may include one of the following: normal, warning, minor, major, or critical. Once a detected fault is resolved another indication report may be transmitted to indicate that it has been overcome, for example, by reporting a "normal" severity status of this part or functionality of the system. Each "critical" status report may result in a special indication to an operator of the system.

The transmission module 130 may interface with each of the broadcasting operators 20a and 20b through one or more communication links of one or more types such as through internet based communication links 91c and 91d. The transmission module 130 may adapt configuration of the alert message according to each of the gateways of each of the CBS servers such as server 20a. Each of the connections between one of the transmission modules 130 and a broadcasting operator may be a dual connection enabling receiving feedback from different broadcasting operators regarding the broadcasting status of alert messages. The transmission module 130 may be an application installed and operated through a plurality of servers for backup purposes. In this manner, in a case of failure in communication originating in one server there will be a fallback option.

According to some embodiments of the present invention, the broadcasting operators 20a and 20b receive feedback information from the presentation devices 10a-10c and/or from the antennas to which the alert message was transmitted. The information indicates the status of transmission of the alert message of each device and/or antenna. Each broadcasting operator automatically transmits a status alert to the processing module 120 upon receiving the status information. The processing module 120, in response, executes a backing process corresponding to the status alert. The backing process may include resending the alert message and/or identification of other suitable broadcasting operators for transmitting the alert message. For example, upon failure of transmitting the alert message through one or more CBS operators the processing module 120 identifies new broadcasting operators using different broadcasting technologies such as through radio and/or cable TV broadcasting systems and hence distributes the alert message to different types of presentation devices such as radios, billboards, TV sets and the like in the same area.

The identification of suitable broadcasting operators for distributing the alert message may be carried out according to the type of the emergency situation indicated in the alert distribution request. For example, if the emergency situation is a fire in a building, the processing module 120 may choose to transmit SMS-CB messages to mobile device users located in the area of the building whereas in a case of a pollution situation, in which a larger population should be notified, the processing module 120 may select several types of broadcasting operators such as cellular, TV and radio broadcasting operators each having a distribution area which corresponds to the emergency situation area.

According to some embodiments of the invention, the processing module 120 allows creating a plurality of alert messages associated with the same alert distribution request, where each message is designated for a different group of broadcasting operators, depending on the details of the alert distribution request. For example, an alert distribution request may refer to a terrorist attack situation in a central street of a city. In this case, the processing module 120 may create a first alert message addressed to mobile device users located in the vicinity of the street using CBS operators for transmitting a first alert message through SMS-CB messaging, and a second alert messages addressed to other types of broadcasting operator such as radio and/or TV broadcasting systems. The content of the first message may be different from the content of the second message. The second alert message may describe the situation in a less severe manner to avoid panic. For example, the first alert message may be in the form of "Bomb attack in Ben Yehuda Street in Jerusalem evacuate immediately and notify the police regarding your whereabouts and well being"; whereas the second alert message may be in the form of "Suspected terrorist attack in Ben Yehuda Street in Jerusalem". The first alert message may be transmitted directly to all mobile device users located in the area of the attack of one or more cellular networks and the second alert message may be displayed at billboards and/or TV devices associated with the distribution area of the attack.

According to some embodiments of the present invention, the central unit 100 identifies broadcasting operators of a plurality of areas relating to one emergency situation. For example, in a case of a Tsunami alert, an oceanic earthquake may be detected by a sensors unit. The sensors unit estimates which coastal areas may be affected by a tsunami caused due to the earthquake. In this case the sensors unit may transmit an alert distribution request including an indication of coastal areas which are in danger of being hit be Tsunami. The central unit 100 then identifies broadcasting operators in distribution areas which correspond to these coastal areas. One or more corresponding alert messages may then be transmitted to the identified broadcasting operators to be broadcasted thereby to presentation devices located in their distribution areas. The central unit 100 may create a plurality of alert message each indicative of one of the coastal areas. Each broadcasting operator having a distribution area corresponding to the respective coastal area receives the appropriate alert message indicative thereof.

According to some embodiments of the present invention, the system allows supporting the emergency situation event in real time throughout the event. The alert receiving interface 110 may receive in real time updated information relating to the emergency situation event, referred to hereinafter as "the event". The information may include the current severity of the situation in real time, the current area of the situation in cases in which the emergency situation area changes such as spreading of pollution and the like, the current status of handling the situation such as indication regarding rescue teams that already arrived at the scene, and the like. The system may be updated every predefined time interval and/or according to the activity in the area. For example, in a case of a fire event, the sensors unit 500 may update when the rescue and firefighting teams have arrived and when the fire was extinguished.

With each update the processing module 120 may create a new updated message relating to the current situation and/or identify alternative or additional broadcasting operators for distributing the updated message in cases, for instance, where the area of the event is changed in location or span.

The content of each updated message may correspond to the current real time situation. This may allow the central unit 100 to support the entire event by allowing people to be aware of the situation in real time and along time in relation to their current location. For example, in a case of a tsunami alert, in which the initial alert distribution request initiated by tsunami detecting systems in the ocean refers to a suspected tsunami in a coastal area, the first corresponding alert message may be in the form of: "suspected tsunami along the east coast of the pacific ocean". At a later time, the detecting systems may output a more focused data in which they can indicate an estimated time in which the tsunami may reach the coast. In this case a second updated alert message may be broadcasted indicating the expected impact time and asking recipients of the message located in the area to evacuate. Once there's no time to evacuate a third alert message may be broadcasted asking people in the area that did not manage to evacuate to look for high platforms or reach the highest floor in the building for preparing themselves for the upcoming impact. This hierarchy of updated alert messages may automatically be created and broadcasted upon receiving of updated information from the alerting sources, thereby enabling real time supporting of the event. Additionally or alternatively, once the first alert message corresponding to the alert distribution request was distributed, the central system 100 may receive updates from other sources and not necessarily only from the alerting sources. These sources may be relevant rescue entities such as systems of the fire department in the area, the police and individuals that use designated GUIs that allows them to update the status of the event in real time, and the like.

The processing module 120 may receive continuous real time updates regarding the event including information indicating the current status of the emergency situation. The processing module 120 may enable deciding whether a new updated alert message is required or not according to the information received. For example, if the received information reveals no change in the status of the emergency situation or a change in the situation that is not sufficiently significant, the processing module 120 may not create and broadcast another alert message until a significant change is identified.

Alternatively, the processing module 120 may resend the same alert message through the same broadcasting operators repeatedly until a significant change is identified. Upon identifying a significant change in the emergency situation, a second alert message may be broadcasted notifying the newly identified status of the event in real time. For example, in a fire situation, the system may transmit the same alert message of "fire in building number five in seventh street" repeatedly, every few minutes through the same broadcasting operators until receiving information that indicates that the fire was handled and extinguished. Once identifying that the fire was fully handled, the processing module 120 creates a new alert message indicating that the fire was extinguished and the area is safe again, where the transmission module 130 transmits the new updated alert message through the same or different broadcasting operators to be broadcasted thereby.

The system may optionally additionally include a conversion application 11, which may be a web application supported by the central unit 100 or an application installed at one or more of the presentation devices such as in presentation device 10*a*. The conversion application 11 may use a text-to-speech conversion program to allow converting the received alert message, in case it is a text message, into a voice message. The conversion application 11 may allow voicing of the converted voice message using audio devices in the respective presentation device 10*a* such as speakers, headphones, and the like. The conversion application 11 may be used by blind users and/or users of poor eyesight and/or any other users who wish to hear the received alert messages.

Figure 2:
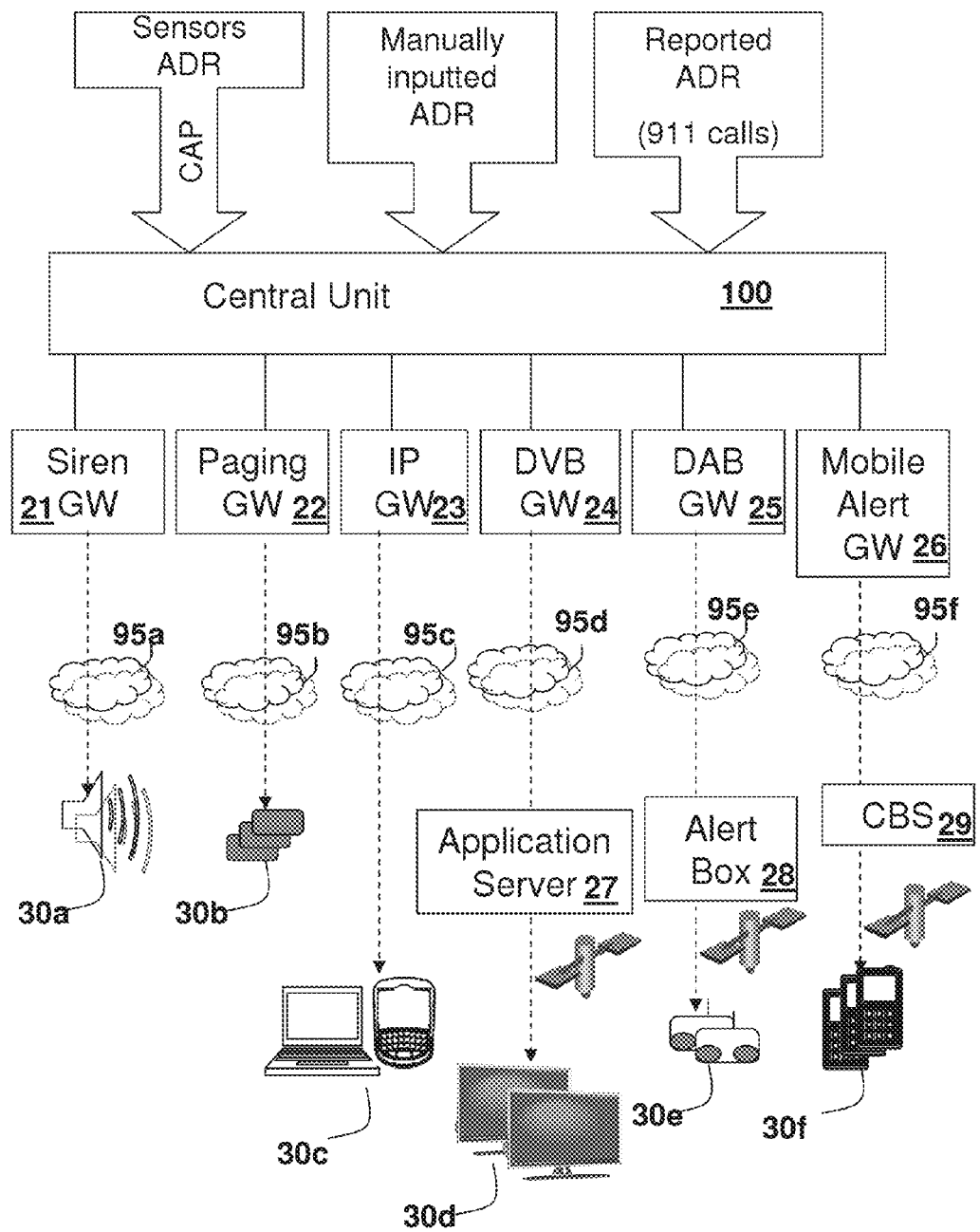
FIG. 2 schematically illustrates a system of distributing alert messages through various types of broadcasting and communication networks, according to some embodiments of the present invention.

Reference is now made to FIG. 2, which schematically illustrates a system of distributing alert messages through various types of broadcasting and communication networks, according to some embodiments of the present invention. The central unit 100 interfaces a plurality of gateways (GW) each associated with a different broadcasting and/or communication network. As illustrated in FIG. 2, the central unit 100 may interface a siren GW 21 enabling broadcasting alert messages to one or more siren systems 30*a* through a first broadcasting network 95*a*. Optionally, the central unit 100 interfaces a paging GW 22 enabling to broadcast alert message through a second broadcasting network 95*b* to pagers 30*b* of subscribed users. Additionally or alternatively, the central unit 100 interfaces an IP GW 23 enabling to transmit alert message such as email messages through an internet communication network 95*c* to computerized systems 30*c* such as PCs, PDAs, laptops, and the like.

The central unit 100 may additionally interface a DVB GW 24 enabling to broadcast alert message through a TV network 95*d* to TV sets 30*d* of subscribed users through one or more application servers 27 and/or a DAB GW 25 enabling to broadcast alert message through a radio network 95*e* to radio devices 30*e* through one or more alert boxes 28. Additionally or alternatively, the central unit 100 interfaces a mobile alert GW 26, which allows broadcasting SMS-CB alert messages through a cellular broadcasting network 95*f*, to mobile devices 30*f* of subscribed users through one or more CBS 29.

The central unit 100 receives alert distribution requests from various alerting sources and types such as CAP messages 101 type requests from sensors units 500, XML based requests 102 from the users' GUI 610, information received from systems of authorities such as the police originating from emergency calls 103, and the like. Each alert distribution request initiates a process in which one or more corresponding alert messages are created. Each alert message may be adapted to interface each of the GWs. The adaptation may include determining whether the message is in the form of a text or a voice message and/or adapting the protocol configuration of the alert message and any other accompanying data that should be transmitted through the GW to the specific GW.

Figure 3:
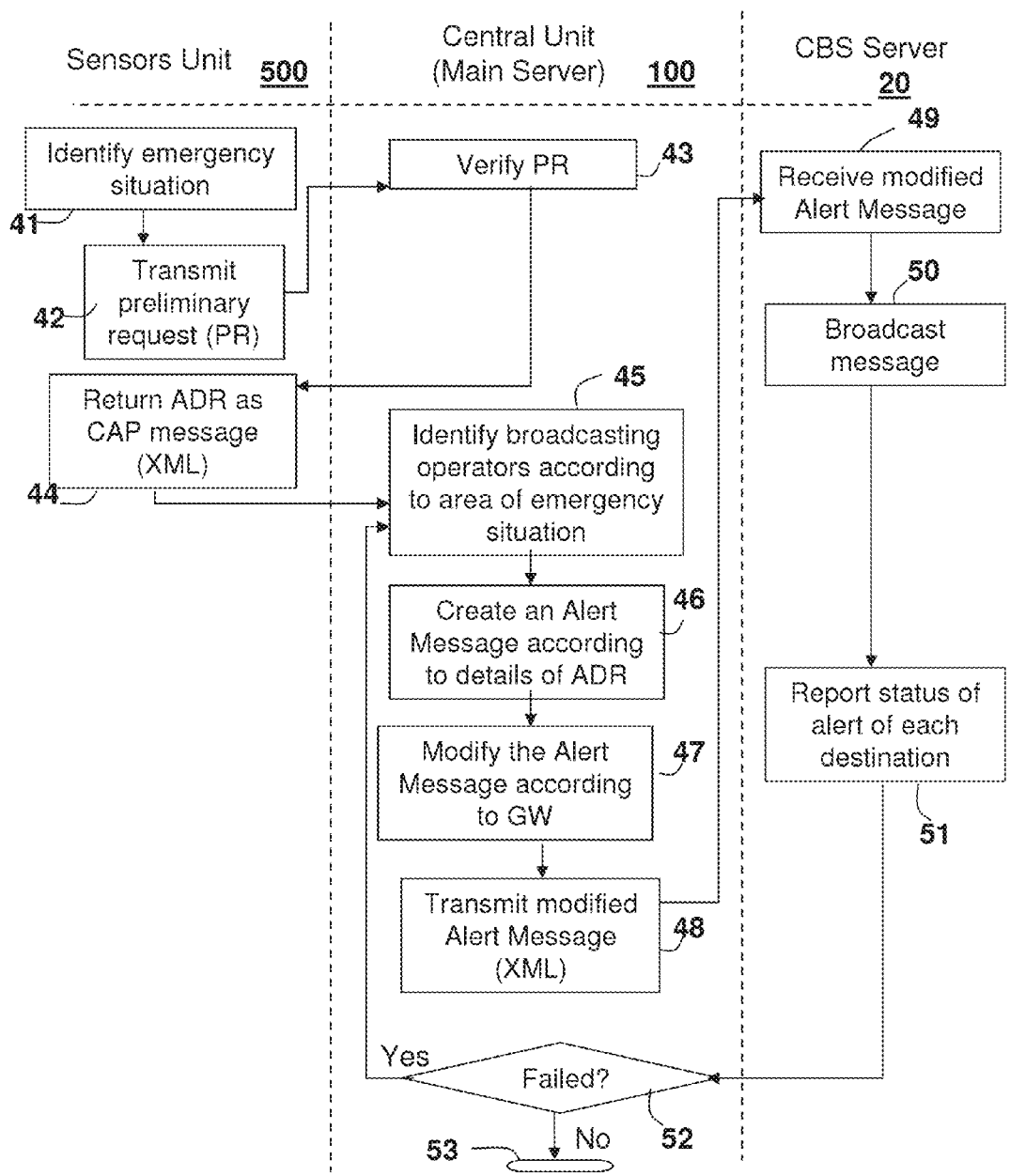
FIG. 3 schematically illustrates a process of managing distribution of alert messages, automatically initiated by a sensors unit, according to some embodiments of the present invention.

Reference is now made to FIG. 3, which schematically illustrates a process of managing distribution of alert messages, automatically initiated by a sensors unit, according to some embodiments of the present invention. In this process, the sensors unit 500 identifies an emergency situation 41 and sends a preliminary request (PR) 42 to the central unit 100, which is a designated server. The central unit 100 verifies the PR 43. The sensors unit 500/FTP server then creates an XML based alert distribution request 44 including all sensors details and additional details such as the area of the emergency situation, the type of the emergency situation, the time, and the like, and transmits the ADR to the central unit 100.

The central unit 100 receives the ADR and analyzes it to identify broadcasting operators of one or more broadcasting networks, suitable for distributing the alert message having a distribution area corresponding to the emergency situation area indicated in the ADR and optionally according to other details of the ADR such as type of the emergency situation and the like 465. Once the suitable broadcasting operators are identified 45, the central unit 100 creates an alert message according to the details of the ADR 46 and modifies the alert message configuration according to configuration requirements of the identified suitable broadcasting operators 47.

The modified XML based alert message is then transmitted by the central unit 500, to the identified suitable broadcasting operators 48 such as to one or more CBS servers 20. Each identified CBS server 20 receives the alert message 49 and broadcasts the alert message through presentation devices associated therewith 50 in its associated distribution area.

Each CBS server 20 enables transmitting distribution status alerts indicating the status of distribution of the alert message 51. The central unit 100 then analyzes the distribution status of each broadcasting operator and executes a backing process for each failed distribution alert of each bro operator 53. In a failed broadcasting situation the central unit 100 retransmits the alert message to the broadcasting operator and/or identifies new broadcasting operators for distributing the alert message in the relevant area by repeating steps 45-48.

Once the general distribution status of the alert message is successful 52 the central unit 100 may terminate the alert distribution process 53.

Figure 4:
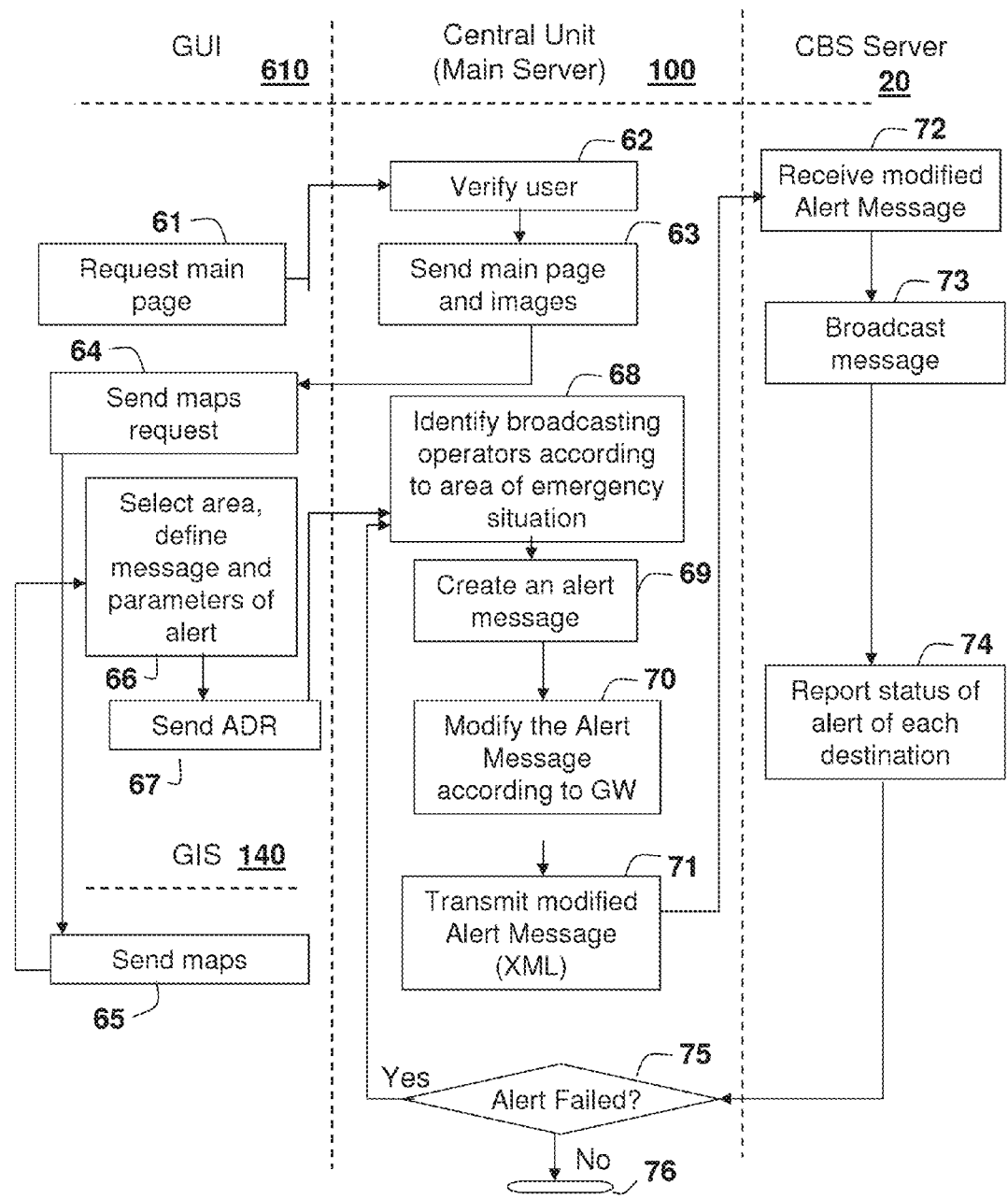
FIG. 4 schematically illustrates a process of managing distribution of alert messages, manually initiated by a user, according to some embodiments of the present invention.

Reference is now made to FIG. 4, which schematically illustrates a process of managing transmission of alerts to a plurality of mobile device users, manually initiated by a user, using the GUI 610, according to some embodiments of the present invention.

In this process, the user identifies an emergency situation and sends a request for receiving a webpage GUI 61 to the central unit 100, which is a designated server. The central unit 100 verifies the user 62 and transmits the requested webpage and images to the user 63. The client 600 used by the user may then automatically send a map request 64 to the GIS 140, which in turn transmits maps and additional images to the user 65.

The user uses the transmitted map to identify and indicate an area associated with the emergency situation and the GUI webpage 610 to define and ADR by inputting the content of the alert message, and selecting other parameters associated with emergency situation, and the like 66. The ADR is then transmitted to the central unit 67.

Steps 68-76 are basically similar to steps 46-54 as depicted in FIG. 3.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system of managing distribution of alert messages to a plurality of presentation devices, said system comprising:
an alert receiving interface, which receives an alert distribution request from an alerting source, said alert distribution request comprises emergency situation data indicative of at least one area associated with the emergency situation;
at least one database including a list of predefined broadcasting operators, each broadcasting operator in said list is associated with at least one distribution area;
a processing module, which creates a plurality of alert messages corresponding to said alert distribution request wherein each of said plurality of alert messages is comprising of different content of information associated with said emergency situation, and identifies a plurality of groups of broadcasting operators from said database, each of said plurality of groups of broadcasting operators is comprising of at least one broadcasting operator associated with a distribution area that corresponds to at least one of said indicated at least one area, wherein at least one of said plurality of groups of broadcasting operators is Cellular Broadcast Service operators and at least one of said plurality of groups of broadcasting operators is not Cellular Broadcast Service operators, wherein each alert message is assigned to a different group of said plurality of groups of broadcasting operators; and a transmission module, which forwards each alert message to its respective broadcasting operator for allowing broadcasting each assigned alert message through a broadcasting operator of suitable group.

2. The system of claim 1, wherein said transmission module interfaces a plurality of broadcasting operators and modifies each of said plurality of alert messages by adapting configuration of said alert messages to a gateway of each of said respective identified broadcasting operators, each said broadcasting operator is a cellular broadcasting system enabling transmission of messages over a plurality of wireless communication links.

3. The system of claim 1, wherein said alert receiving interface further enables receiving updated information, in real time, indicating current status of the emergency situation, said processing module creates new updated alert messages corresponding to said updated information, wherein said transmission module forwards said updated alert messages for being broadcasted substantially in real time through said identified broadcasting operators.

4. The system of claim 3, wherein said processing module further enables identifying
   alternative suitable broadcasting operators upon identifying a change in the area associated with the emergency situation from said updated information, said transmission module forwards said updated messages to said alternative suitable broadcasting operators so as to be broadcasted in real time thereby.

5. The system of claim 1, wherein said processing module receives status alerts from said broadcasting operator indicating transmission status of said alert message in relation to each broadcasting operator to which the alert message was transmitted, said processing module identifies a broadcasting failure from said status alerts, said processing module executes a backing process for re-broadcasting said alert message upon identification of said broadcasting failure.

6. The system of claim 1, further comprising at least one sensors unit, which detects at least one alerting condition in a predefined area, and transmits an alert distribution request to said alert receiving interface upon said detection, said alert distribution request comprises sensors data and the respective predefined area, said processing module automatically determines said broadcasting operators according to a combination of said sensors data and said predefined area.

7. The system of claim 1, further comprising a graphical user interface which enables a user to create said alert distribution request and to send said alert distribution request to said alert receiving interface over a communication link.

8. The system of claim 1, wherein said processing module identifies a plurality of broadcasting operators from said database each associated with a distribution area that corresponds to one of a plurality of indicated areas associated with an emergency situation; and said transmission module forwards said alert messages to said identified plurality of broadcasting operators so as to allow distributing said alert messages to said plurality of presentation devices in a plurality of corresponding distribution areas via at least one broadcasting network.

9. The system of claim 8, wherein said a plurality of alert messages, each indicative of a respective one of said plurality of areas, each said identified broadcasting operator broadcasts a respective said alert message indicative of an area corresponding to its distribution area.

10. A method of managing transmission of alert messages to a plurality of presentation devices, said method comprising:

receiving an alert distribution request from an alerting source, said alert distribution request comprises emergency situation data, indicative of an area associated with the emergency situation;
creating a plurality of alert messages corresponding to said alert distribution request wherein each of said plurality of alert messages is comprising of different content of information associated with said emergency situation;
identifying a plurality of groups of broadcasting operators, wherein at least one of said plurality of groups of broadcasting operators is Cellular Broadcast Service operators and at least one of said plurality of groups of broadcasting operators is not Cellular Broadcast Service operators, each of said plurality of groups of broadcasting operators is comprising of at least one broadcasting operator which enables distributing said alert messages in said area;
forwarding each of said alert messages to each said identified plurality of groups of broadcasting operators allowing broadcasting each assigned alert message through a broadcasting operator of suitable group; and
broadcasting said alert messages to said plurality of presentation devices via at least one broadcasting network.

11. The method of claim 10, further comprising modifying said alert messages according to configuration requirements of each respective said at least one broadcasting operator.

12. The method of claim 10, further comprising transmitting at least one map to a user for allowing the user to define at least one area associated with said emergency situation.

13. The method of claim 10, further comprising automatically transmitting an alert distribution request, upon detection of an emergency situation.

14. The method of claim 10, further comprising automatically converting textual content of said alert message into a voice message using text to speech conversion, and voicing said voice message through audio devices of said presentation devices.

15. The system of claim 1, wherein said alert receiving interface further enables receiving updated information, in predefined time intervals, indicating current status of the emergency situation, said processing module creates new updated alert messages corresponding to said updated information, wherein said transmission module forwards said updated alert messages for being broadcasted substantially in predefined time intervals through said identified broadcasting operators.

16. The system of claim 15, wherein said processing module repeats the last alert messages corresponding to said updated information until said alert receiving interface receives a new updated information, wherein said transmission module forwards said repeated last alert messages for being broadcasted substantially in predefined time intervals through said identified broadcasting operators.

* * * * *